Patented Apr. 9, 1940

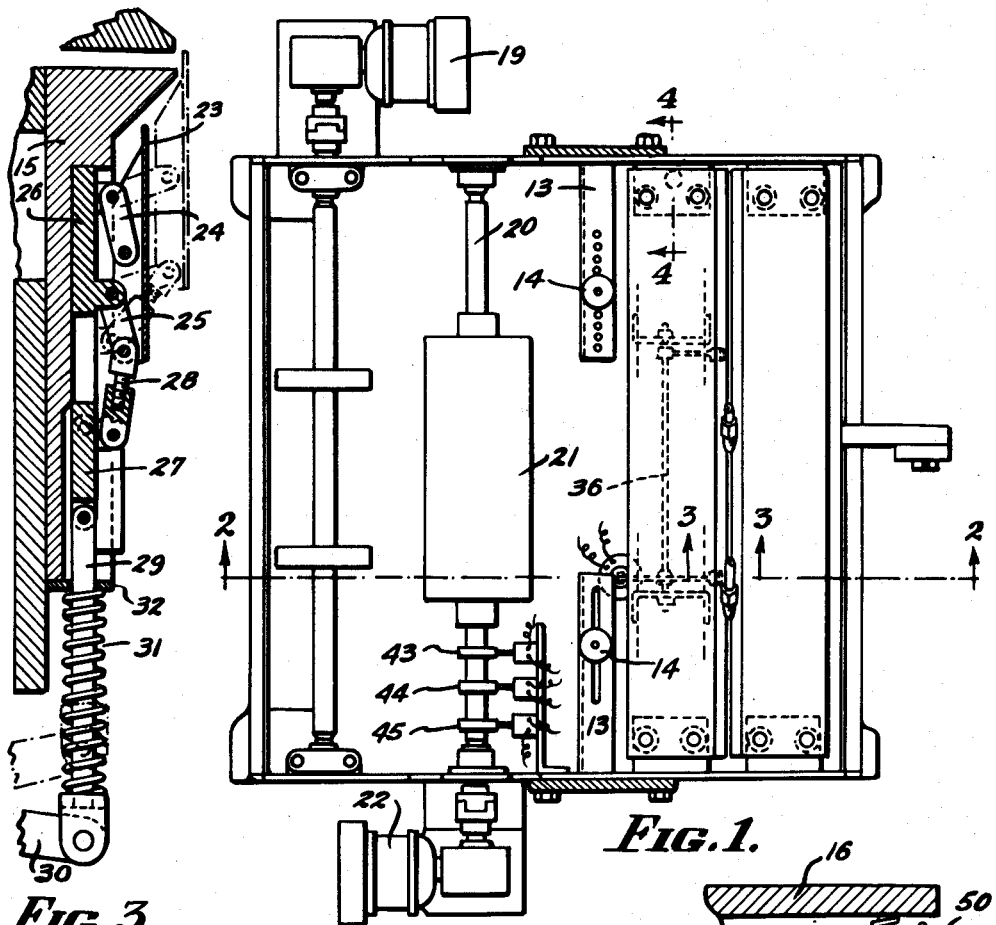
FIG.1.
FIG.3.
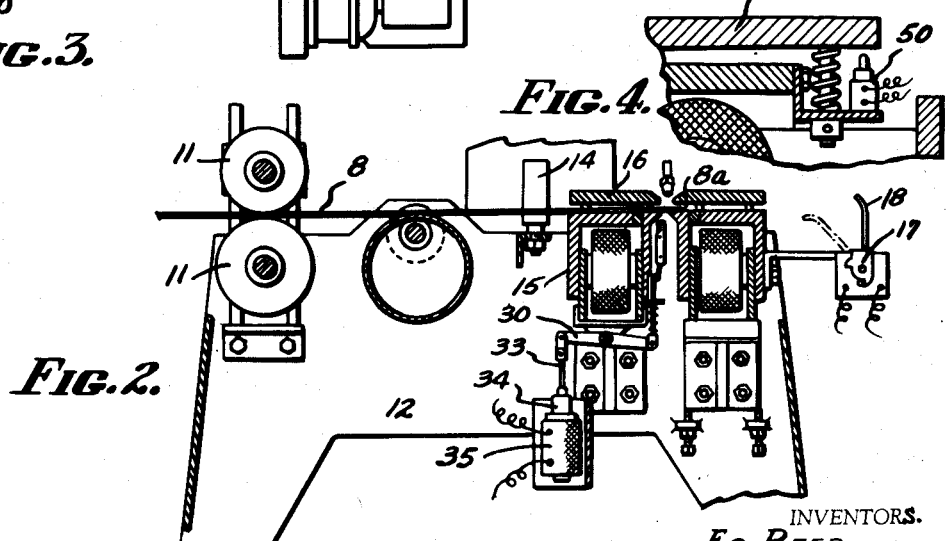
FIG.4.
FIG.2.
INVENTORS.
Eo Reed
AND Eugene R. Mizer.
BY Allen & Allen
ATTORNEYS.

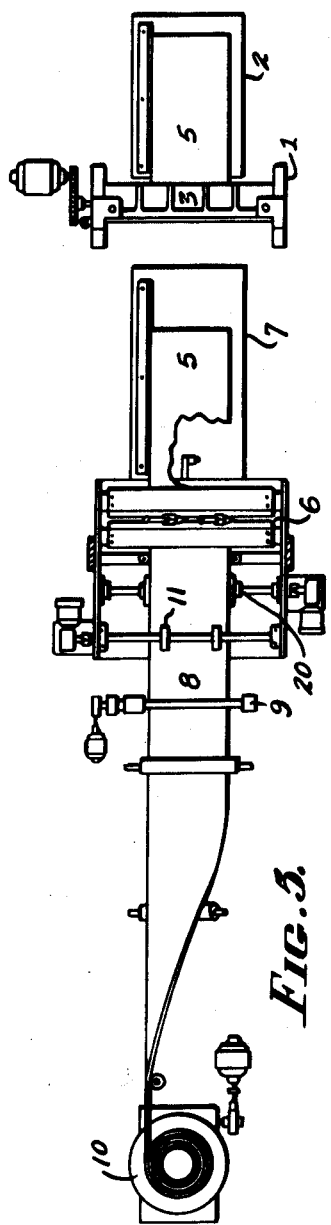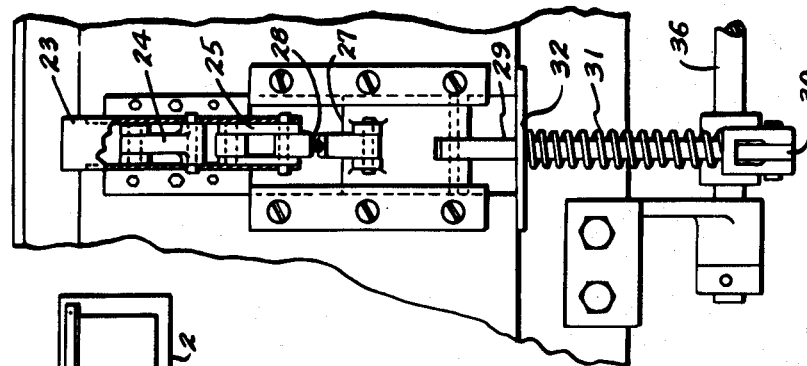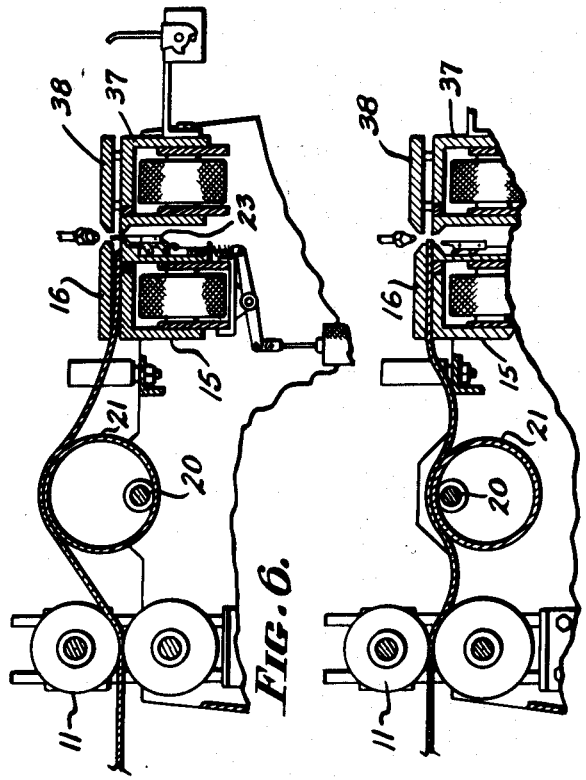

2,196,941

UNITED STATES PATENT OFFICE 2,196,941

POSITIONING MEANS FOR WELDING DEVICES

Eo Reed and Eugene R. Mizer, Zanesville, Ohio, assignors to The American Rolling Mill Company, Middletown, Ohio, a corporation of Ohio Application April 27, 1939, Serial No. 270,400

17 Claims. (Cl. 113—59)

Our invention relates to means for positioning work pieces for the formation of butt welds. It is, for example, of especial utility in the operation of joining sheets to form a strip of indefinite length, as in the copending applications of Fay and Reed, Ser. Nos. 132,824 and 132,825 filed March 24, 1937. The details of the mechanism and procedure of the said copending applications do not form a limitation upon our present invention, but are illustrative of a field of utility for it; and our invention will be described in connection with so much of such mechanism as is essential to an understanding of our contribution to the art, for the purpose of an exemplary showing.

In the operation referred to, the trailing end of the strip and the leading end of the work piece which is to be joined to it must be accurately butted, the line of juncture must be located accurately at the welding line, and the sheet and strip clamped in accurately located position before any welding may be done. This is tedious and time consuming.

It is an object of our invention to provide a means for rapidly locating one of the work pieces accurately and clamping it, since, once this is accomplished, it is simple and easy to butt the end of the other work piece against the located end of the first work piece.

It is an object of our invention to accomplish the accurate location of the first work piece in an automatic manner, thereby making the operation very rapid and eliminating errors arising from the human element.

As applied to the locating of the trailing end of the welded strip, it is our object to provide means for automatically moving the strip forward.

Since the work pieces are not always of uniform lengths, our objects include the provision of automatic moving and positioning means which will be effective in spite of length variations.

These and other objects of our invention which will be set forth hereinafter or will be apparent to one skilled in the art upon reading these specifications, we accomplish by that certain construction and arrangement of parts and by that sequence of steps of which we shall now describe the aforesaid exemplary embodiment. Reference is made to the drawings wherein:

Figure 1 is a plan view showing our invention applied to a welding apparatus.

Figure 2 is a vertical sectional view thereof taken along the lines 2—2 of Figure 1.

Figure 3 is a partial sectional view showing the mechanical construction of locating fingers employed by us.

Figure 4 is a fragmentary sectional view showing a switch mechanism, and taken along the lines 4—4 of Figure 1.

Figure 5 is a plan view of a shearing, welding and coiling assembly.

Figure 6 is a semi-diagrammatic view showing one stage in the locating operation.

Figure 7 is a similar view showing a final stage.

Figure 8 is an elevational view of the locating finger construction.

Figure 9:
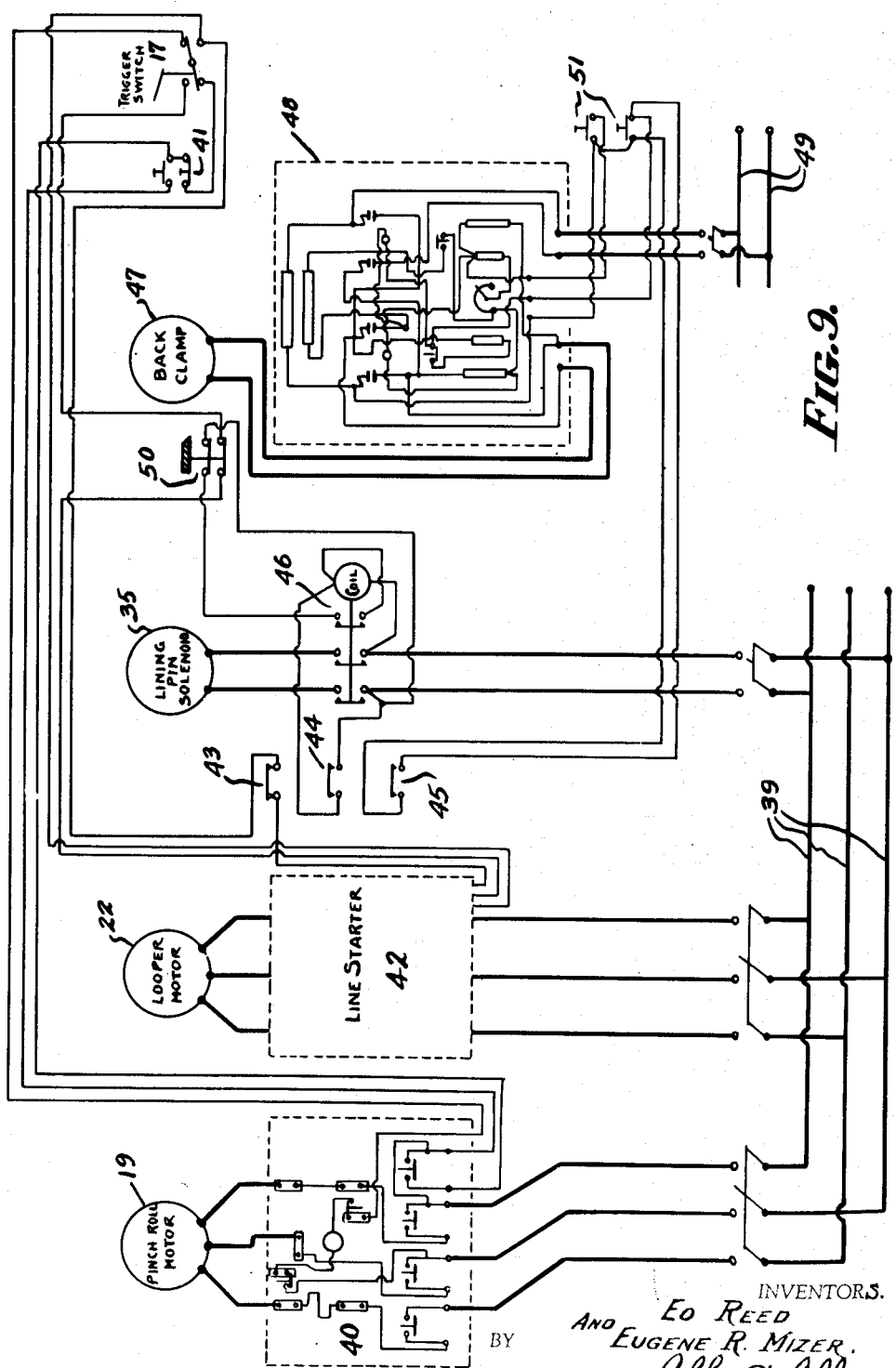
Figure 9 is a wiring diagram for the apparatus.

In the practice of our invention we provide an automatic means for positioning the trailing end of the welded strip accurately at the welding line. This is the most difficult positioning operation because the great length of the welded strip and its engagement by other apparatus in the line makes the operation of hand positioning a relatively difficult and tedious one. Thus the prepositioning of the trailing end of the welded strip eliminates much more than half of the labor of positioning, making it quite easy for the operator to position by hand the fresh sheet which is to be welded to the strip.

For the purpose to which we have referred, we provide a mechanism which, after a weld has been formed at the welding station, feeds the welded strip forward until the trailing end of the sheet which has just been welded to the strip is brought near to but not quite to the welding line. Then the feeding mechanism is stopped, thus holding the strip at the feeding mechanism. Means intermediate the welding device and the feeding device aforesaid are now brought into play to bend the strip so as to bring its trailing end beyond the welding line. Positioning fingers at the welding line are next brought upwardly to provide means for establishing the desired welding position of the trailing end of the strip. Next the means which has taken up the strip so as to bring it beyond the welding line is released so that the trailing end of the strip moves reversely until it comes into contact with the positioning fingers so that it assumes the desired position. Clamping means at the welding line next are energized to fix the end of the strip in this position. Thereafter the positioning fingers are withdrawn and the fresh sheet can quickly and easily be brought with its end in abutment with the already positioned trailing end of the strip. All these operations, with the exception of the positioning of the fresh sheet, are arranged to be carried on automatically in proper sequence.

Referring first to Figure 5 for the general assembly of apparatus used in welding thin silicon steel sheets, we have shown a shear 1 having a shear table 2, and clamping means 3 for sheets 5. At this station the ends of the sheets are sheared while being clamped with a given pressure effective over a given area of the sheets. The numeral 6 in Figure 5 indicates generally a welding station having an approach table 7. At this station the sheet 5 is welded to the trailing end of a preformed welded strip 8. At the line of weld, it is necessary, as taught in the copending applications referred to above, to clamp the trailing end of the welded strip and the end of the sheet under the same pressures effective over the same areas as were used during shearing in order to get an accurately butted joint. The particular operation of welding need not be here described but can be ascertained in the copending cases. The numeral 9 represents a device for rolling the weld in the strip; and the strip is turned so as to be disposed vertically and is coiled as at 10. A pinch roll arrangement 11 serves after the formation of a weld at 6 to feed the strip forward.

Referring now to Figure 2, the pinch rolls 11 suitably mounted in guideways initially feed the strip 8 to the position shown where its end 8a has not quite come to the line of weld. The pinch rolls 11 may conveniently be mounted upon the frame 12 which supports the welding apparatus. This frame may be provided with brackets 13 which bear side guide rollers 14 contacting the edge of the strip for keeping it in position along the center line of the machine. The clamping means comprises a magnet 15 and an upper clamping member 16 between which the strip passes. As it approaches the welding device the strip passes over a limit switch 17 for an actuating arm 18. This actuating arm is held depressed by the strip; but when the end of the strip has released it, it serves to stop the drive for the pinch rolls 11 in such a way that the end 8a of the strip occupies substantially the position shown in Figure 2. The pinch rolls are driven by a motor 19.

When the pinch rolls have been stopped, they act as a clamp for the strip at a portion interspaced from its end. On the frame of the machine we mount a shaft 20 bearing an eccentric drum 21. The shaft is driven through suitable gearing or the like by a motor 22. Normally the eccentric drum lies in the position shown in Figure 2 so that its upper surface is below the level of the strip when the strip is flat. The shaft 20 as it rotates carries the eccentric drum 21 around, bumping the strip up in the center so as to pull the end of the strip beyond the line of weld. This is illustrated in Figure 6 where it will be clear that the drum 21 acts as a take-up means for the strip. When the end of the strip has been moved beyond the line of weld through the open clamp 15, 16 positioning fingers 23 are moved upwardly into position adjacent the clamp. The construction of these fingers is illustrated in Figures 3 and 8. Here the finger proper is formed from angularly bent iron or steel and is mounted by means of links 24 and 25 on a support 26 on the frame of the machine or upon the clamp 15. These links are so constructed and proportioned as to permit the finger to occupy either the position shown in solid lines where it is completely out of the way of the welding operation or the position shown in dotted lines in which the end of the finger extends upwardly into the plane of the sheet material to be welded. For operating the finger we provide a carriage member 27 slidable in ways and connected by means of a link 28 to the finger. It will be clear from the figures that when the carriage 27 moves upwardly toward the support 26 the finger will be moved toward the position shown in dotted lines. The link 28 can be made adjustable as shown. The carriage is connected by a rod or link 29 to an operating lever 30. To avoid shock, a coiled spring 31 may be placed about the rod 29 bearing upon an abutment at the lower end of the rod and an abutment 32 on the frame or clamp at the upper end of the spring. We prefer to operate the fingers by means of an electrical solenoid, though they may be otherwise operated if desired. The lever 30 as shown in Figure 2 is pivoted beneath the clamp 15 and is connected by a suitable linkage 33 to the armature 34 of a solenoid 35. We may provide as many of the fingers across the weld line as may be deemed desirable. Each finger may be operated by a separate solenoid or the lever 30 which is attached to the solenoid may be non-rotatably mounted upon a shaft 36 as shown in Figure 1 to which other levers or arms for operating other fingers may be rigidly mounted, so that one solenoid will operate all of the fingers.

Referring again to Figure 6, it will be clear that as the eccentric drum 21 continues to rotate, the slack in the strip will be diminished, and the end 8a thereof will move forwardly again until it comes into contact with the fingers 23 and is positioned thereby with great accuracy at the welding line. When this position is attained, the magnetic clamp 15 is energized bringing the clamp member 16 down against the end of the strip to hold it in position.

Thereafter the return of the eccentric drum 21 to its original position will give a configuration to the strip as shown in Figure 7, the pinch rolls 11 remaining stationary. The trailing end of the strip has, however, been completely and accurately positioned and is now clamped; and the fingers 23 may now be withdrawn as shown in Figure 7 by the de-energization of the solenoid. It is now only necessary to bring the fresh sheet 5 onto the table 7, pass its end through the clamp 37, 38 and bring its end into abutment with the end of the strip which has already been positioned. This may readily be done by hand. As soon as the fresh sheet is so positioned, the magnetic clamp 37, 38 is energized and the welding operation may be started.

As we have indicated, we prefer to provide means for the automatic sequential operation of the elements we have just described. In Figure 9 we have given a wiring diagram which is an exemplary means for the purpose. Power voltage for the several motors is supplied by lines 39. These lines feed a starting box and controller 40 for the pinch roll motor 19. The pinch roll motor 19 has a starting circuit connected with a button 41 by which the operator may start the motor. The motor also has a holding circuit connected with the trigger switch 17 so that the motor will be stopped as we have before explained when the trailing end of the strip passes the trigger switch. The motor 22 which drives the looper is fed through a control box 42 from the same mains 39. The trigger switch 17 is also conncted to a control circuit for the motor 22 so that when the pinch roll motor 19 is stopped the looper motor 22 is started.

For successive operations, we now rely on switches 43, 44 and 45 on the shaft 20 of the eccentric cylinder 21. These switches serve to control thereafter both the operation of the looper motor and in part the operation of the positioning pins and the clamping means. The lining pin solenoid 35 is shown as fed from the mains 39 through a relay switch 46. When the eccentric drum 21 has reached its maximum height, the switch 44 on its shaft energizes the relay 46 and thus energizes the solenoid 35 bringing the lining or positioning pins into the position shown in dotted lines in Figure 3. The windings 47 of the clamp 15, 16 are shown as fed through a control box 48 from lines 49. This arrangement was chosen because the magnetic clamping means must be energized by direct current whereas it is usually preferred to use alternating current for the rest of the apparatus. Hence the two main feed circuits 39 and 49. Now the magnetic controller 48 for the clamp windings is provided with an energizing circuit connected to the switch 45 on the shaft 20 so that when the shaft has rotated to the proper position, allowing the strip end 8a to come back against the fingers 23, the clamp will be energized. We provide in connection with the clamp member 16, as shown in Figure 4, a switch 50 which will be actuated by the clamp 16 upon energization thereof. This switch 50 is in the circuit of the relay 46 and serves to de-energize the solenoid 35 as will be readily understood. It is also in the circuit of the control box 42 and the switch 17 as well as the switch 43 on the shaft 20. It serves to set the control circuits for the looper motor 22 so that this motor will be de-energized when the eccentric cylinder 21 has returned to the position shown in Figures 2 and 7, at which position a holding circuit will be opened by the switch 43. Manual control switches 51 are provided for the clamp windings 47 as shown.

By the means just described the several operations for the positioning of the trailing end of the strip are carried on in proper sequence automatically as will now be clear.

Modifications may be made in our invention without departing from the spirit of it. Having thus described our invention, what we claim as new and desire to secure by Letters Patent is:

1. In welding apparatus welding means at a welding line, and clamping means thereat, means for feeding strip-like material past said welding line, means for stopping the feeding means before the rear end of said strip-like material has passed said welding line, and means intermediate said welding means and said feeding means for taking up said material by bending it out of its plane, whereby said end of said material is moved with respect to said welding line.

2. Apparatus as claimed in claim 1 including automatic means for correlating the operations of said feeding means and said taking up means.

3. In welding apparatus welding means at a welding line, and clamping means thereat, means for feeding strip-like material past said welding line, means for stopping the feeding means before the rear of said strip-like material has passed said welding line, and means intermediate said welding means and said feeding means for taking up said material by bending it out of its plane, whereby said end of said material is moved with respect to said welding line so as to pass said welding line, a movable abutment means at said welding line, and means for moving said abutment means into the line of movement of said strip-like material.

4. In welding apparatus welding means at a welding line, and clamping means thereat, means for feeding strip-like material past said welding line, means for stopping the feeding means before the rear of said strip-like material has passed said welding line, and means intermediate said welding means and said feeding means for taking up said material by bending it out of its plane, whereby said end of said material is moved with respect to said welding line so as to pass said welding line, a movable abutment means at said welding line, and means for moving said abutment means into the line of movement of said strip-like material, and means for causing said taking up means to pay out said strip-like material so that said end thereof moves reversely to come against said abutment means.

5. In welding apparatus welding means at a welding line, and clamping means thereat, means for feeding strip-like material past said welding line, means for stopping the feeding means before the rear end of said strip-like material has passed said welding line, and means intermediate said welding means and said feeding means for taking up said material by bending it out of its plane, whereby said end of said material is moved with respect to said welding line so as to pass said welding line, a movable abutment means at said welding line, and means for moving said abutment means into the line of movement of said strip-like material, and means for causing said taking up means to pay out said strip-like material so that said end thereof moves reversely to come against said abutment means, and automatic means for correlating the operations of said feeding means, said taking up means and said abutment means.

6. In welding apparatus welding means at a welding line, and clamping means thereat, means for feeding strip-like material past said welding line, means for stopping the feeding means before the rear end of said strip-like material has passed said welding line, and means intermediate said welding means and said feeding means for taking up said material by bending it out of its plane, whereby said end of said material is moved with respect to said welding line so as to pass said welding line, a movable abutment means at said welding line, and means for moving said abutment means into the line of movement of said strip-like material, and means for causing said taking up means to pay out said strip-like material so that said end thereof moves reversely to come against said abutment means, and means to actuate said clamping means when said end of said strip-like material has come against said abutment means.

7. Apparatus as claimed in claim 1 in which said feeding means are driven by a motor, and in which said stopping means include a switch for said motor positioned so as to be actuated by said strip-like material.

8. Apparatus as claimed in claim 1 in which said feeding means comprise pinch rolls, driven by a motor, and which said taking up means are rotary eccentric means also driven by a motor, and positioned to deflect said strip-like material.

9. Apparatus as claimed in claim 1 in which said feeding means comprise pinch rolls, driven by a motor, and which said taking up means are rotary eccentric means also driven by a motor, and positioned to deflect said strip-like material, and automatic means for correlating the operations of said feeding means and said taking up means, said correlating means comprising switch means actuated by said strip-like material for stopping said feeding means and starting said take-up means, and means in connection with said last mentioned means for stopping it after a predetermined cycle of operation.

10. Apparatus as claimed in claim 4 in which said feeding means comprises pinch rolls driven by a motor, said taking up means comprises a rotary eccentric means driven by a motor, and in which said means for moving said abutment comprise electromotive means, and automatic means for correlating the operation of said several means, comprising switch means actuated by said strip-like material for stopping said feeding means and starting said taking up means, and switch means in connection with said taking up means to actuate said moving means for said abutment means.

11. Apparatus as claimed in claim 4 in which said feeding means comprises pinch rolls driven by a motor, said taking up means comprises a rotary eccentric means driven by a motor, and in which said means for moving said abutment comprise electromotive means, and automatic means for correlating the operation of said several means, comprising switch means actuated by said strip-like material for stopping said feeding means and starting said taking up means, and switch means in connection with said taking up means to actuate said moving means for said abutment means so as to bring it into the plane of said strip-like material, and further switch means in connection with said taking up means for stopping said taking up means and for actuating said clamping means.

12. Apparatus as claimed in claim 4 in which said feeding means comprises pinch rolls driven by a motor, said taking up means comprises a rotary eccentric means driven by a motor, and in which said means for moving said abutment comprise electromotive means, and automatic means for correlating the operation of said several means, comprising switch means actuated by said strip-like material for stopping said feeding means and starting said taking up means, and switch means in connection with said taking up means to actuate said moving means for said abutment means so as to bring it into the plane of said strip-like material, and further switch means in connection with said taking up means for stopping said taking up means and for actuating said clamping means, and switch means actuated by said clamping means for effecting return of said abutment means.

13. In apparatus of the character described, welding means at a welding line, feeding means for strip-like material interspaced therefrom, and means for deflecting strip-like material located intermediate said welding means and said feeding means, said feeding means, when stopped, acting to hold said strip-like means at a point interspaced from its end, whereby said deflecting means is enabled to move said end with respect to said welding line so as to bring said end across said welding line and back again, and abutment means at said welding line to position said end upon its reverse movement.

14. A process of positioning work for welding which comprises, as a series of steps automatically occurring in sequence, feeding the work forward, holding it at a point interspaced from its end, deflecting the work between said point and said end so as to bring said end beyond a preselected position, providing an abutment at said position, and allowing said end to move back to said position.

15. A process of positioning work for welding which comprises, as a series of steps automatically occurring in sequence, feeding the work forward, holding it at a point interspaced from its end, deflecting the work between said point and said end so as to bring said end beyond a preselected position, providing an abutment at said position, and allowing said end to move back to said position, and clamping said end at said position.

16. In apparatus of the character described, welding means at a welding line, feeding means for strip-like material interspaced therefrom, means for holding the material at a point interspaced from the welding means, and movable means for deflecting the strip-like material located intermediate said welding means and said holding means, and having sufficient range of movement to cause an end of the material to be drawn past said welding line and returned thereto.

17. Apparatus as claimed in claim 16 in which said feeding means, when stopped, acts to hold said material.

EO REED.
EUGENE R. MIZER.